United States Patent [19]
Habgood

[11] 3,939,945
[45] Feb. 24, 1976

[54] CLOSED-LOOP TYPE DISC BRAKE
[75] Inventor: Gordon Alfred Habgood, Shipston-on-Stour, England
[73] Assignee: Girling Limited, Birmingham, England
[22] Filed: July 22, 1974
[21] Appl. No.: 490,662

[30] Foreign Application Priority Data
July 24, 1973 United Kingdom............... 35205/73

[52] U.S. Cl............................... 188/73.4; 188/72.5
[51] Int. Cl.[2]........................................ F16D 55/228
[58] Field of Search ........ 188/73.3, 73.4, 72.4, 72.5

[56] References Cited
UNITED STATES PATENTS

| | | | |
|---|---|---|---|
| 3,251,436 | 5/1966 | Afanador et al. | 188/72.5 |
| 3,372,778 | 3/1968 | Hambling | 188/72.5 |
| 3,525,420 | 8/1970 | Honick et al. | 188/72.4 |
| 3,608,678 | 9/1971 | Kobayashi | 188/73.4 |

FOREIGN PATENTS OR APPLICATIONS

| | | | |
|---|---|---|---|
| 563,738 | 6/1957 | Italy | 188/72.4 |
| 1,270,684 | 7/1961 | France | 188/73.4 |

Primary Examiner—George E. A. Halvosa
Assistant Examiner—Edward R. Kazenske
Attorney, Agent, or Firm—Scrivener Parker Scrivener and Clarke

[57] ABSTRACT

In an hydraulically-operated disc brake of the single sided reaction type for a vehicle, an hydraulic actuator includes first and second pistons for applying friction pad assemblies to opposite faces of a rotatable disc, one piston acting directly on one friction pad assembly and the other piston acting on the other friction pad assembly through a yoke. The other piston and the yoke are rigidly connected and the pistons and the housing are sealed by flexible sealing boots.

7 Claims, 6 Drawing Figures

CLOSED-LOOP TYPE DISC BRAKE

This invention relates to hydraulically-operated disc brakes for vehicles of the kind in which friction pad assemblies are adapted to be applied to opposite faces of a rotatable disc by an hydraulic actuator located on one side of the disc and including first and second oppositely acting pistons movable relative to a stationary housing, one friction pad assembly known as the directly actuated friction pad assembly being applied directly to the disc by the first piston and the other friction pad assembly, known as the indirectly actuated friction pad assembly, being applied to the opposite face of the disc by the second piston which acts on the indirectly actuated friction pad assembly through a yoke which straddles a portion of the periphery of the disc and is movable with respect to the stationary housing in a direction parallel with the axis of the disc.

In known disc brakes of the kind set forth the yoke is guided in notches or grooves in the outermost ends of the stationary housing and, when the brake is applied, the drag on the indirectly actuated friction pad assembly is transmitted through the yoke to one of the ends of the housing depending upon the direction of disc rotation. Thus, the yoke is permitted a limited movement in a circumferential direction with respect to the housing and with respect to the second piston. Since the co-operating guide surfaces between the yoke and the housing are exposed to atmosphere and other damaging medium, corrosion can take place which may impair the operation of the brake.

According to our invention in a disc brake of the kind set forth for vehicles the yoke and the second piston are rigidly connected, and the drag on the indirectly actuated friction pad is transmitted to the housing through the second piston which is of an axial length substantially equal to that of the housing, the pistons and the housing being sealed by means of flexible sealing boots connected between the housing and each piston.

Thus, the yoke is guided solely with respect to the housing by the second piston over an area which is substantial, and since the surfaces by which the yoke are guided are sealed by one of the boots, such surfaces are protected against the effects of corrosion.

Conveniently the second piston is provided with axially extending coupling means which are rigidly connected to the yoke.

In one construction the coupling means comprises a pair of circumferentially spaced axially extending spigots which project through complementary openings in the yoke and of which the projecting outermost end portions are screw-threaded to receive nuts for clamping the second piston against the yoke. In a modification the coupling means comprises a single threaded boss, and means are incorporated to prevent relative rotation between the yoke and the second piston.

Preferably, the second piston is hollow and works in an open-ended axially extending bore in the housing, and the first piston works in the second piston.

Two embodiments of our invention are illustrated in the accompanying drawings in which FIG. 1 is a longitudinal section through and hydraulically-operated disc brake for a vehicle;

Figure 1:
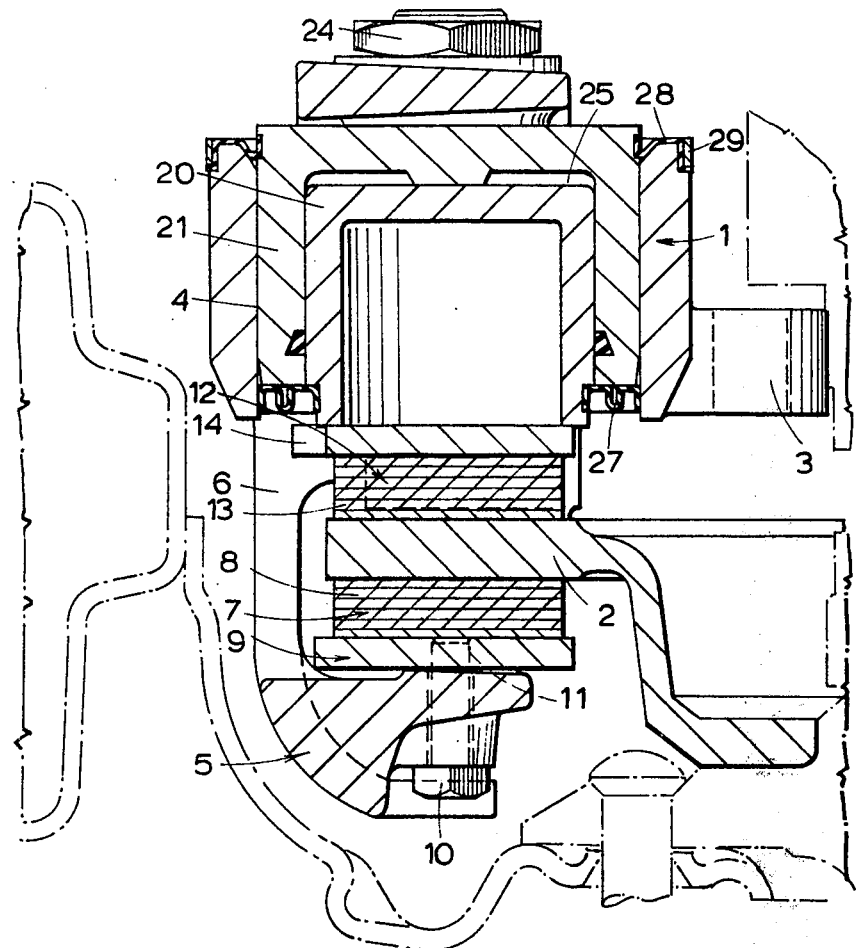
Figure 2:
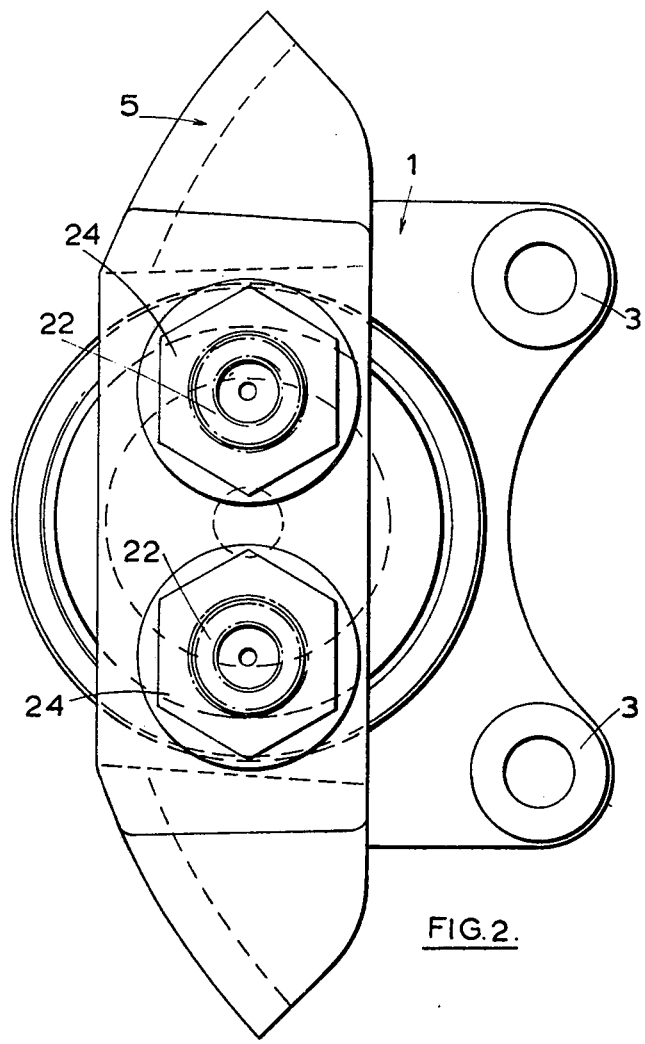
FIG. 2 is an end view of the brake illustrated in FIG. 1.
Figure 3:
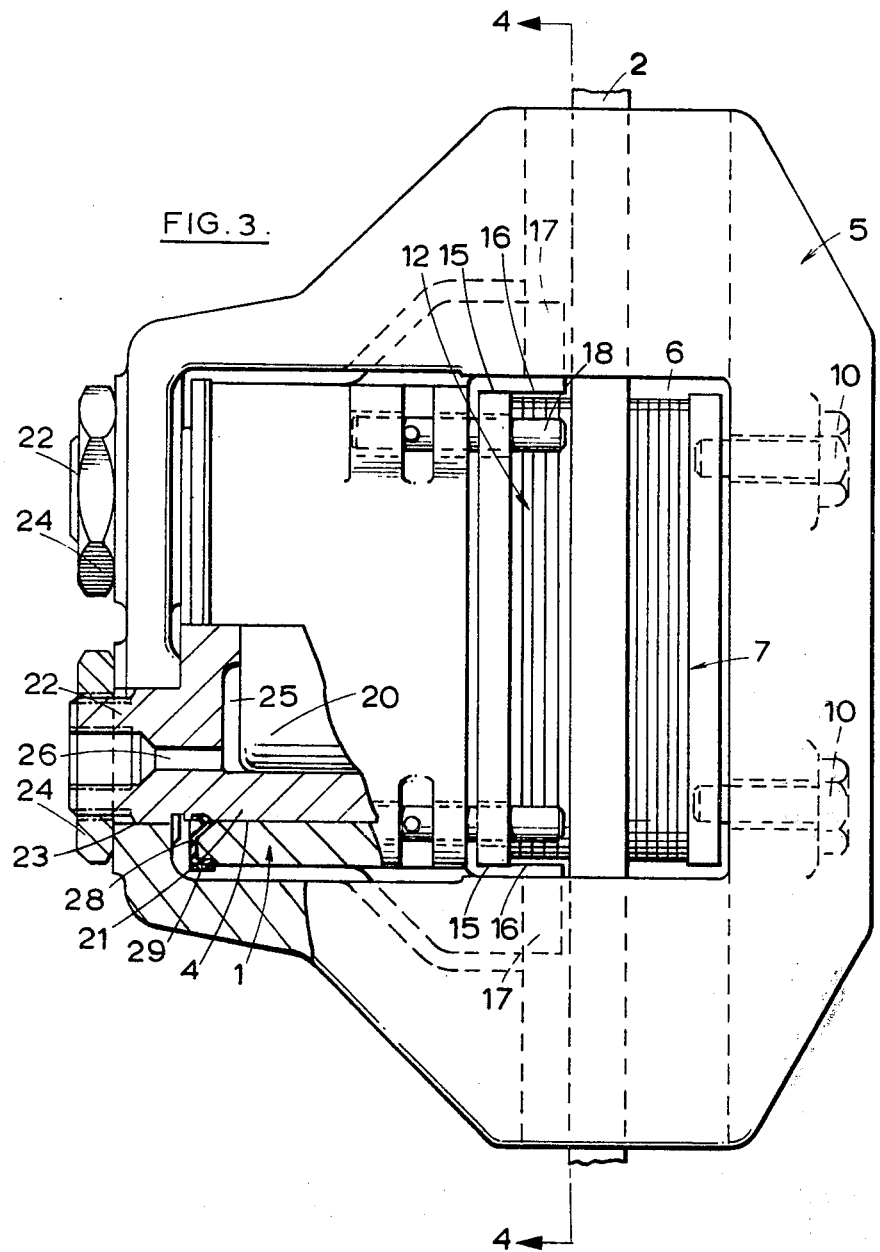
FIG. 3 is a part-sectional plane of the brake.
Figure 4:
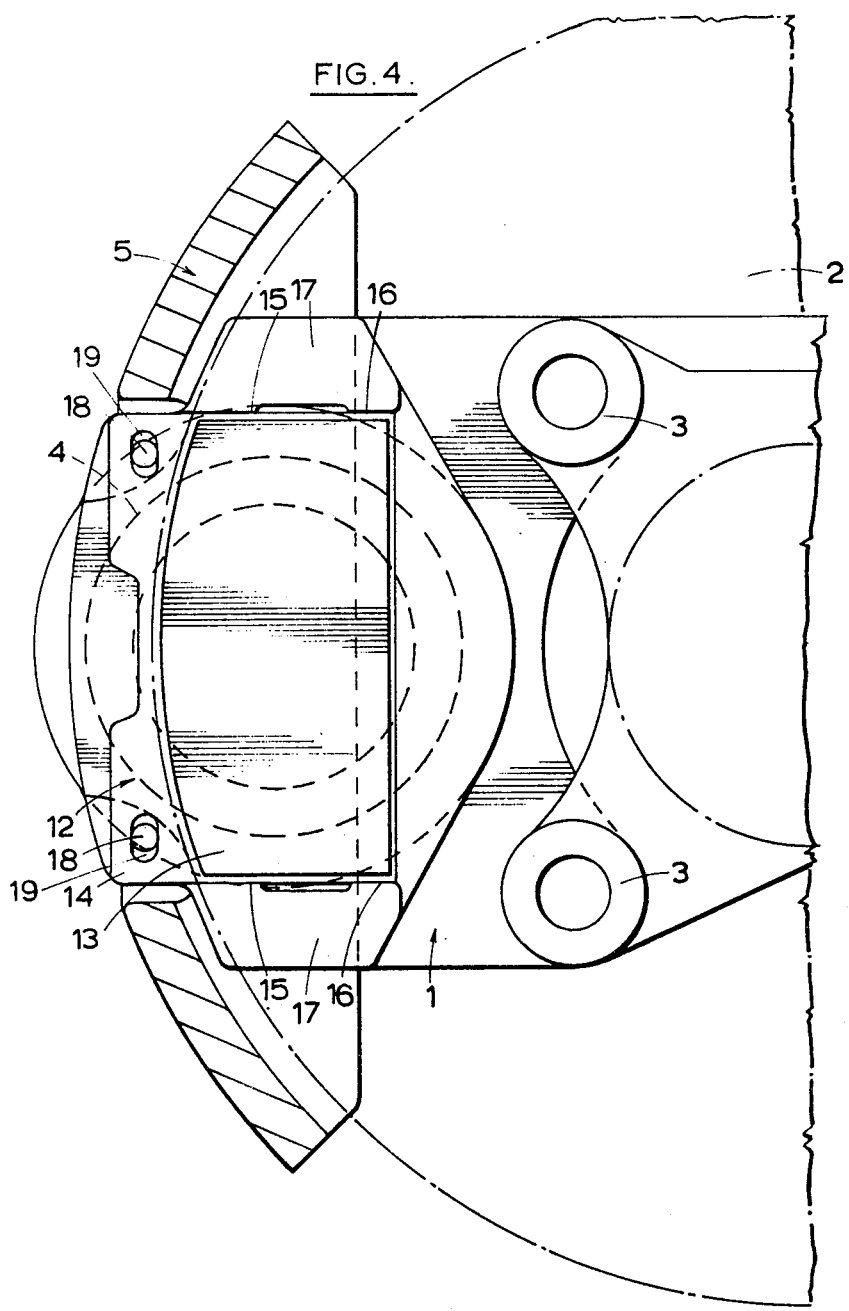
FIG. 4 is a section on the line 4—4 of FIG. 3.

In the hydraulically-operated disc brake illustrated in the drawings 1 is a stationary housing located on one side of a rotatable disc 2. The housing 1 has inwardly projecting apertured lugs 3 to receive bolts by which it is secured to a non-rotatable part adjacent to the disc 2. The housing 1 is provided with an open-ended longitudinally extending bore 4 of which the axis is at right angles to the plane of the disc 2.

A rigid yoke 5 fits loosely over the housing 1 and straddles a portion of the periphery of the disc 2 to which it is chordal. The yoke 5 has a central opening 6 which receives the housing 1 and a portion of the peripheral edge of the disc.

A friction pad assembly 7 for engagement with the face of the disc 2 remote from the housing 1 comprises a pad 8 of friction material carried by a rigid backing plate 9. The backing plate 9 is secured to an adjacent portion of the yoke 5 by means of a pair of circumferentially spaced bolts 10 which are screwed through the yoke and at their inner ends define spigots engaging in complementary openings 11 in the backing plate 9. A friction pad assembly 12, for engagement with the face of the disc adjacent to the housing 1, comprises a pad 13 of friction material carried by a rigid backing plate 14. Circumferentially spaced parallel end faces 15 of the backing plate engage slidably with a pair of complementary surfaces 16 comprising the inner faces of a pair of circumferentially spaced arms 17 integral with and projecting towards the disc from the housing 1. The shoulders at the inner ends of arms 17 also serve to retain the yoke 5 against angular movement with the disc and with respect to the housing in the application of the brake. The friction pad assembly 12 is retained against movement in a radial direction with respect to the housing 1 by means of axially extending pins 18 which are received within circumferentially elongate openings 19 in the backing plate 14.

The friction pad assembly 12 is applied directly to the disc by an hydraulic first piston 20 in sliding and sealing engagement with a hollow second outer piston 21 which is itself slidable in the bore 4 in the housing 1 and is of an axial length substantially equal to that of the housing 1. The closed outer end of the piston 21 has a pair of circumferentially spaced axially projecting spigots 22 which extend through complementary openings 23 in the yoke and at their outer ends are screw-threaded to receive nuts 24 by means of which the yoke 5 is rigidly connected to the second piston 21.

Hydraulic fluid is conveyed to a space 25 between the pistons by a flexible pipe connected to the outer end of a passage 26 extending through one of the spigots 22. The other spigot may also be provided with a similar passage (not shown) for bleeding purposes. Such a passage will normally be closed by a bleed screw.

When hydraulic fluid under pressure from a master cylinder is supplied to the space 25 the pistons 20 and 21 are urged apart in an axial direction. The piston 20 applies the friction pad assembly 12 directly to the adjacent face of the disc and the piston 21 moves the yoke 5 in the opposite direction to apply the friction pad assembly 7 to the opposite face of the disc.

Whatever the direction of rotation of the disc, the drag on the friction pad assembly 12 is taken directly by one of the arms 17 and the drag on the friction pad assembly 7 is transmitted through the yoke 5 onto the housing 1 through the piston 21 over a substantial area defined by the portion of the piston 21 which, at that time, is housed within the bore 4.

As illustrated in the drawings an annular boot of flexible material 27 is formed at its inner and outer peripheral edges with continuous beads or thickenings which are received in complementary annular grooves in the housing 1 and in the forward end of the piston 20 which projects from the piston 21. Similarly, an annular boot 28 is provided at its inner peripheral edge with a continuous thickening or bead which is received in an annular groove in a portion of the piston 21 which projects from the housing 1 and the outer peripheral edge of the boot 28 is clamped against the outer face of the housing 1 by means of a retaining ring 29. The boots 27 and 28 seal from atmosphere the guiding surfaces defined by the engagement of the piston 21 in the bore 4 and the engagement of the piston 20 in the bore of the piston 21.

In a modification the upper radially outermost surfaces of the arms 17 are machined or otherwise constructed and arranged to provide surfaces of minimum frictional resistance on which the yoke is slidably guided. This facilitates operation of the brake by reducing the frictional resistance to movement of the yoke 5 transmitted to the pad assembly 7 through the yoke 5.

Figure 5:
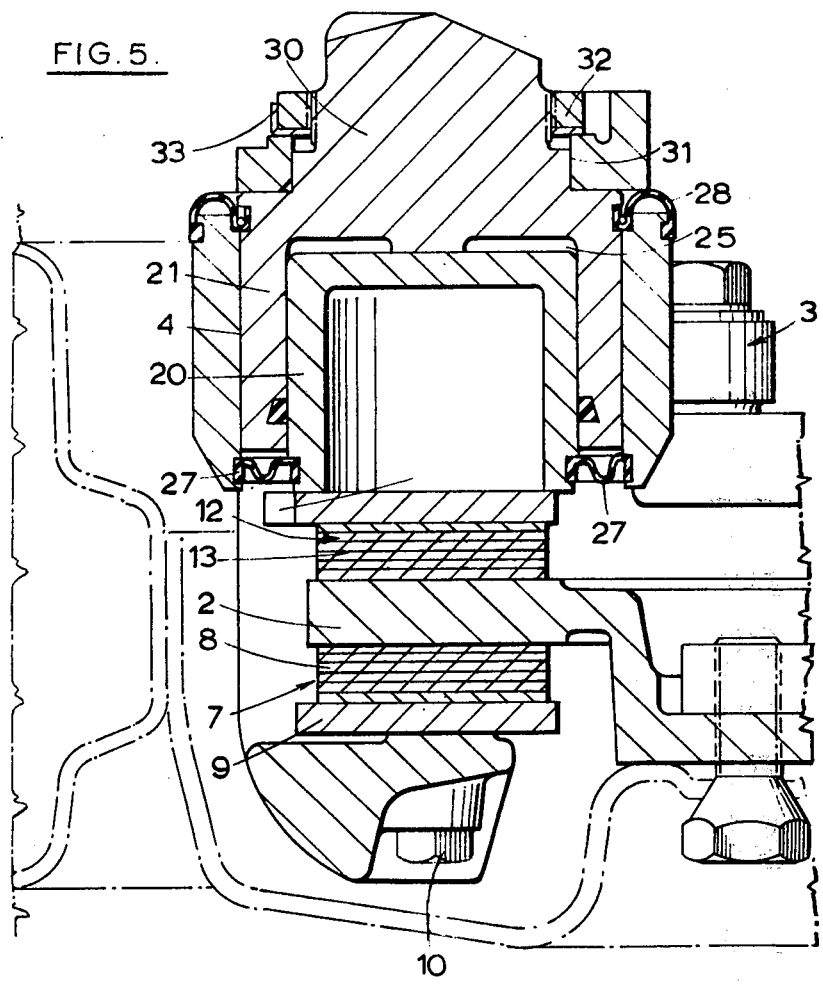
FIG. 5 is a longitudinal section through another brake.
Figure 6:
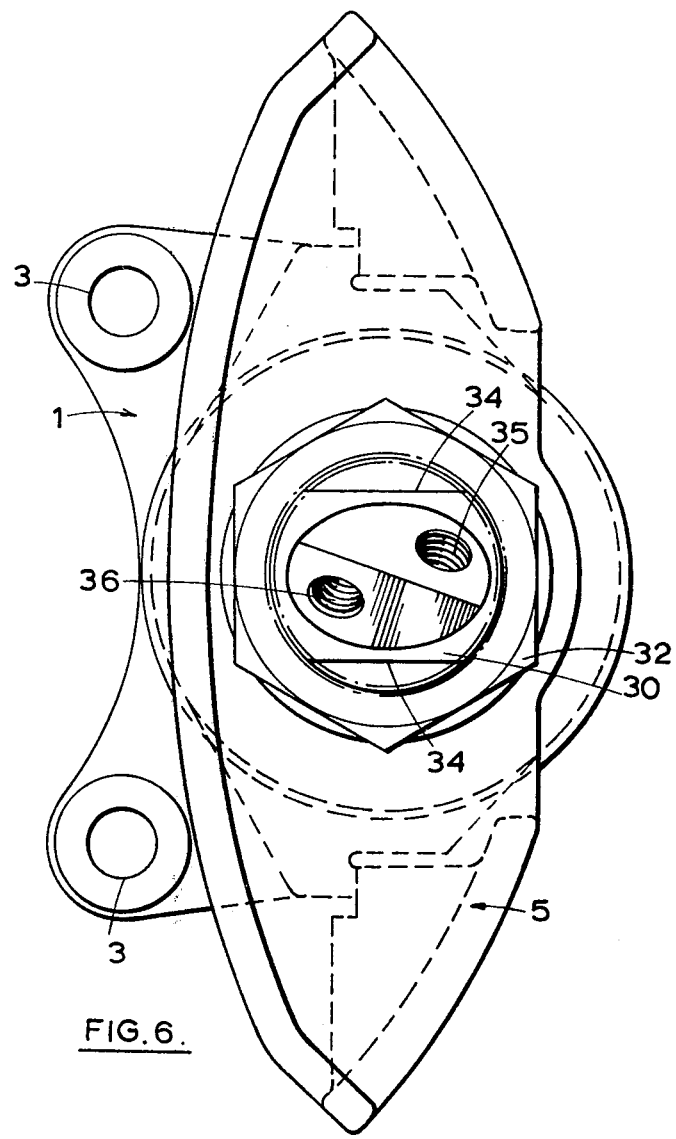
FIG. 6 is an end view of the brake illustrated in FIG. 5.

In the modified construction illustrated in FIGS. 5 and 6 of the drawings the piston 21 is provided with a single integral central boss 30 which projects through a complementary opening 31 in the yoke 5. A portion of the boss 30 projecting from the yoke is reduced in diameter and is screw threaded externally to receive a clamp nut 32 which clamps the yoke 5 and the piston 21 together. A locking tab washer 33 is provided to lock the yoke 5, the piston 21, and the nut 32 against relative rotation.

At least the outer end of the reduced diameter portion of the boss 3 is provided with parallel flats 34 to enable the piston 21 to be held against rotation as the nut 32 is being tightened. Also the boss 30 is provided with passages 35 and 36, both of which are inclined inwardly with respect to the axis of the piston 21 and communicate with the space 25 between the piston. The passage 35 comprises the supply passage for hydraulic fluid and the passage 36 comprises the bleed passage.

The construction and operation of the brake illustrated in FIGS. 5 and 6 is otherwise the same as that of FIGS. 1 to 4 and corresponding reference numerals have been applied to corresponding parts.

I claim:

1. An hydraulically-operated disc brake for a vehicle comprising a rotatable disc, friction pad assemblies for engagement with opposite faces of said disc, an hydraulic actuator for applying said friction pad assemblies to said disc located on one side of said disc, said hydraulic actuator comprising a stationary housing incorporating spaced arms projecting towards said disc, and first and second oppositely acting pistons movable relative to said housing, said second piston being of an axial length substantially equal to that of said housing, a yoke straddling a portion of the periphery of said disc and fitting loosely over said housing and said arms, said yoke being movable with respect to said housing in a direction parallel with the axis of said disc, one of said friction pad assemblies hereinafter referred to as "a directly actuated friction pad assembly" being applied directly to said disc by said first piston and the other friction pad assembly hereinafter referred to as "an indirectly actuated friction pad assembly" being applied to said disc by said second piston which acts on said indirectly actuated friction pad assembly through said yoke, a rigid connection between said yoke and said second piston constructed and arranged so that the drag on said indirectly actuated friction pad assembly is transmitted to said housing only through said second piston, flexible sealing boots connected between said housing and each piston, and said directly actuated friction pad assembly being guided for movement with respect to said disc between said arms which take the drag on said directly actuated friction pad when the brake is applied so that the drag on said indirectly actuated pad assembly is taken by said housing through said second piston independently of said arms.

2. A disc brake as claimed in claim 1, wherein axially extending coupling means on said second piston are rigidly connected to the yoke.

3. A disc brake as claimed in claim 2, wherein said coupling means comprises a pair of circumferentially spaced axially extending spigots which project through complementary openings in said yoke and have outermost end portions which are screw-threaded to receive nuts for clamping said second piston against said yoke.

4. A disc brake as claimed in claim 2, wherein said coupling means comprises a single boss which projects through a complementary opening in said yoke and has an outermost end portion which is screw-threaded to receive a nut for clamping said second piston against said yoke.

5. A disc brake as claimed in claim 4, wherein means are incorporated for preventing relative rotation between said yoke and said second piston after said nut is tightened.

6. A disc brake as claimed in claim 4, wherein said end portion is provided with parallel flats by means of which said second piston can be held against rotation as said nut is tightened, and a locking tab washer is incorporated for locking said yoke, piston and nut against relative rotation.

7. A disc brake as claimed in claim 1, wherein said housing has an inner end and an outer end and is provided with an open-ended axially extending bore, said second piston is hollow and is adapted to work in said bore, and said first piston is adapted to work in said second piston, one of said sealing boots being connected between said second piston and said outer end of said housing and the other of said sealing boots being connected between said first piston and said inner end of said housing.

* * * * *